Feb. 16, 1954

R. GOURDON 2,669,365

APPARATUS FOR SORTING ARTICLES SUCH AS MAIL

Filed Aug. 4, 1947

INVENTOR
Robert Gourdon
by George W. Cooley
HIS ATTORNEY

Feb. 16, 1954 R. GOURDON 2,669,365
APPARATUS FOR SORTING ARTICLES SUCH AS MAIL
Filed Aug. 4, 1947 12 Sheets-Sheet 2
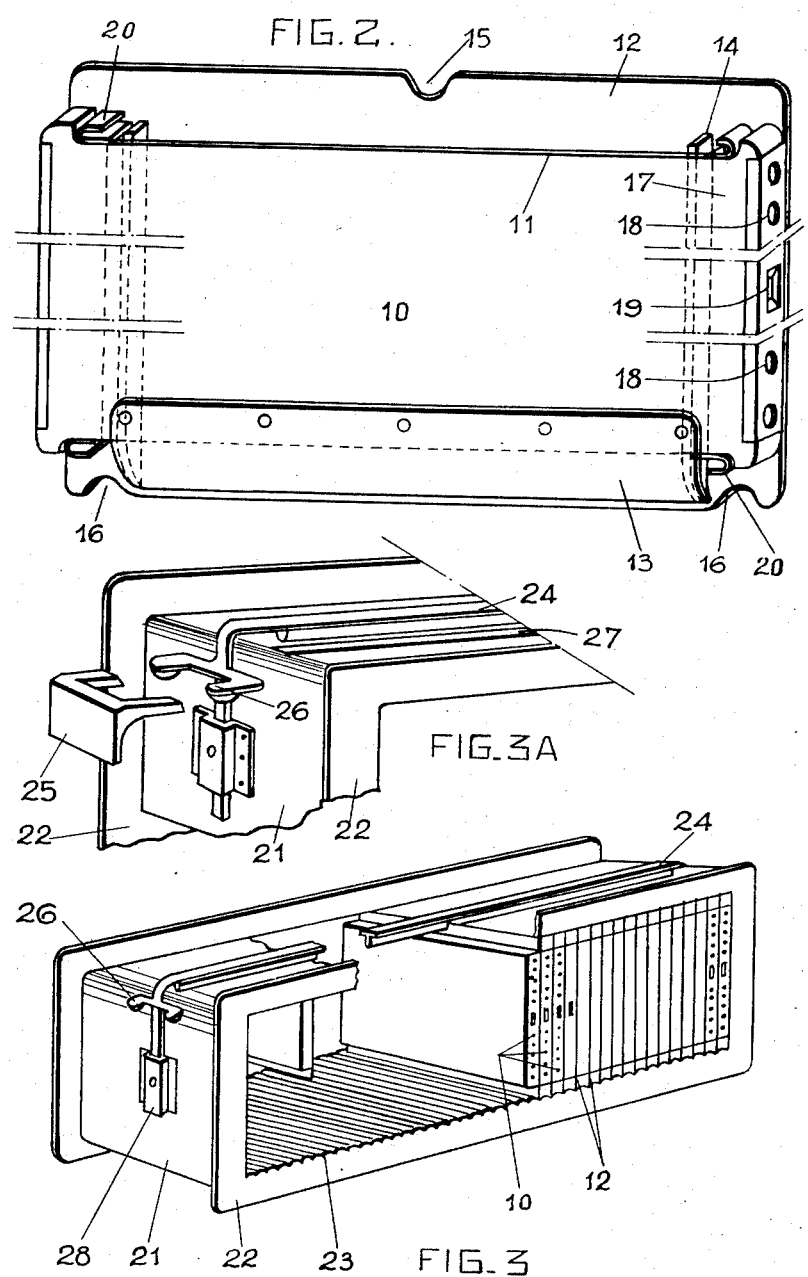
INVENTOR
Robert Gourdon
by George N. Corey
HIS ATTORNEY Feb. 16, 1954   R. GOURDON   2,669,365
APPARATUS FOR SORTING ARTICLES SUCH AS MAIL
Filed Aug. 4, 1947   12 Sheets-Sheet 3

INVENTOR
Robert Gourdon
by George H. Corley
HIS ATTORNEY

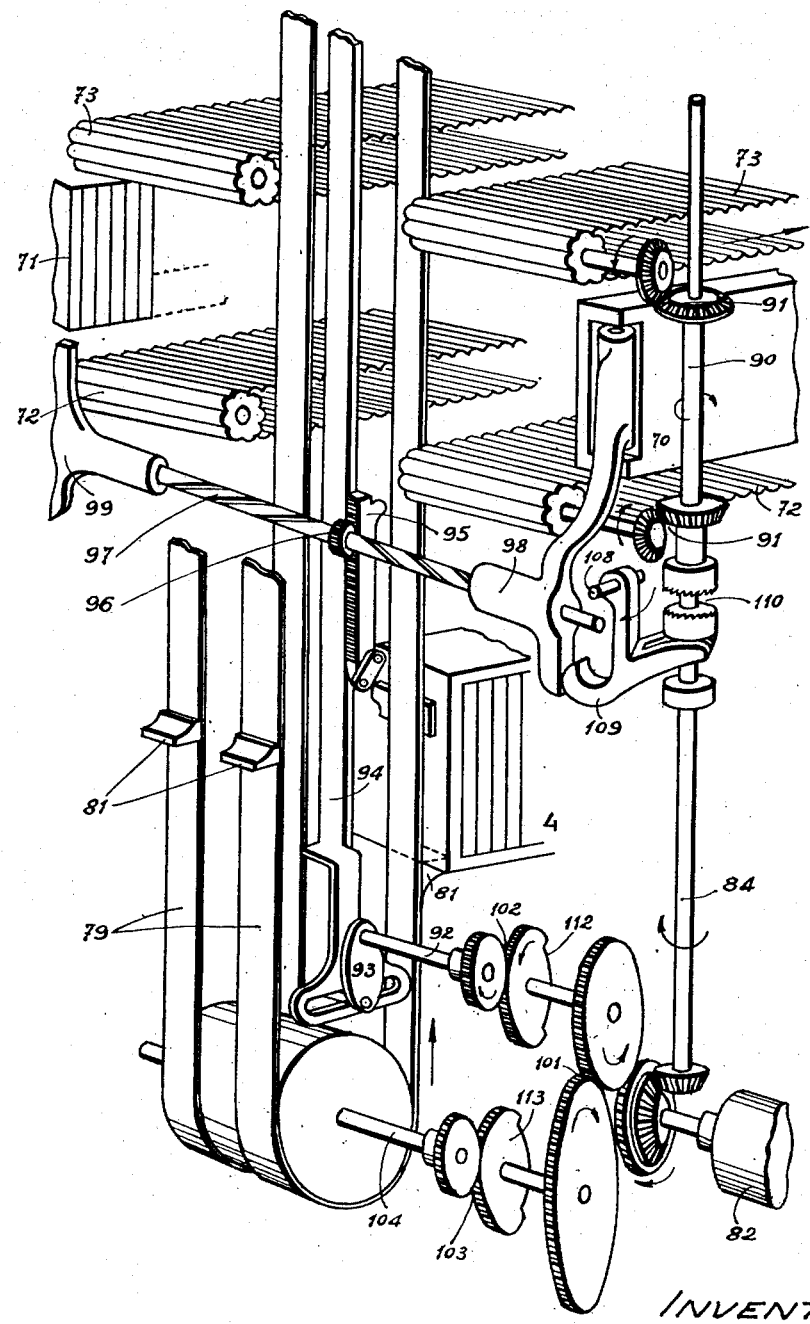

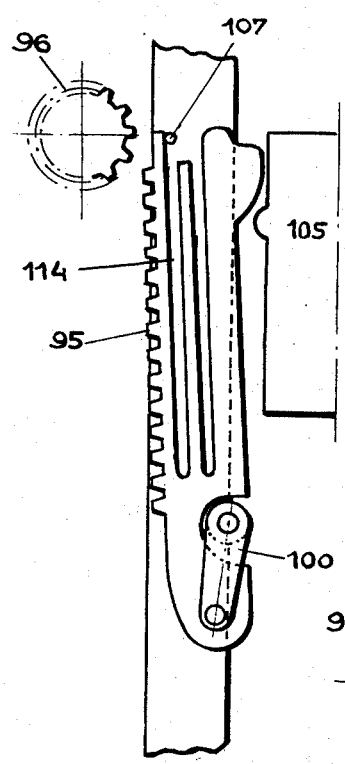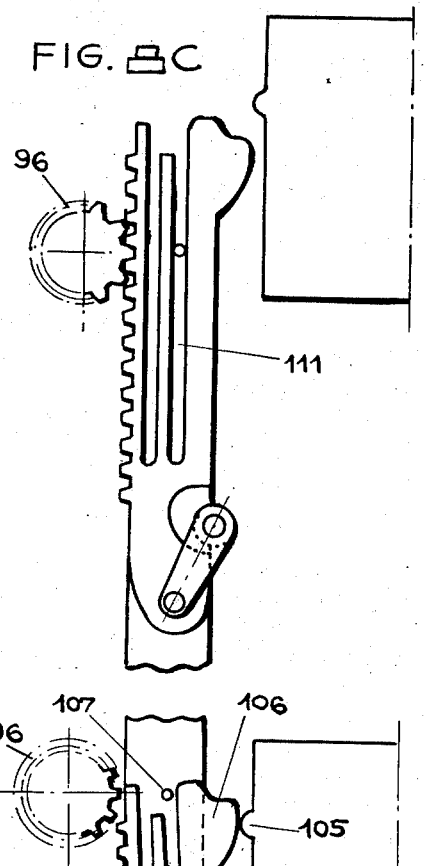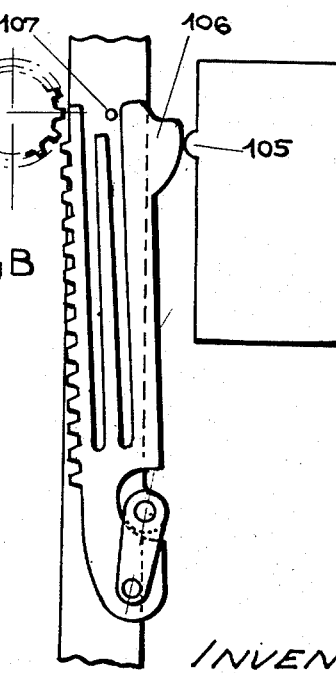

Feb. 16, 1954  R. GOURDON  2,669,365
APPARATUS FOR SORTING ARTICLES SUCH AS MAIL
Filed Aug. 4, 1947  12 Sheets-Sheet 7

INVENTOR
Robert Gourdon
by George H. Corey
HIS ATTORNEY

Feb. 16, 1954   R. GOURDON   2,669,365
APPARATUS FOR SORTING ARTICLES SUCH AS MAIL
Filed Aug. 4, 1947   12 Sheets-Sheet 8

INVENTOR
Robert Gourdon
by George H Corley
HIS ATTORNEY

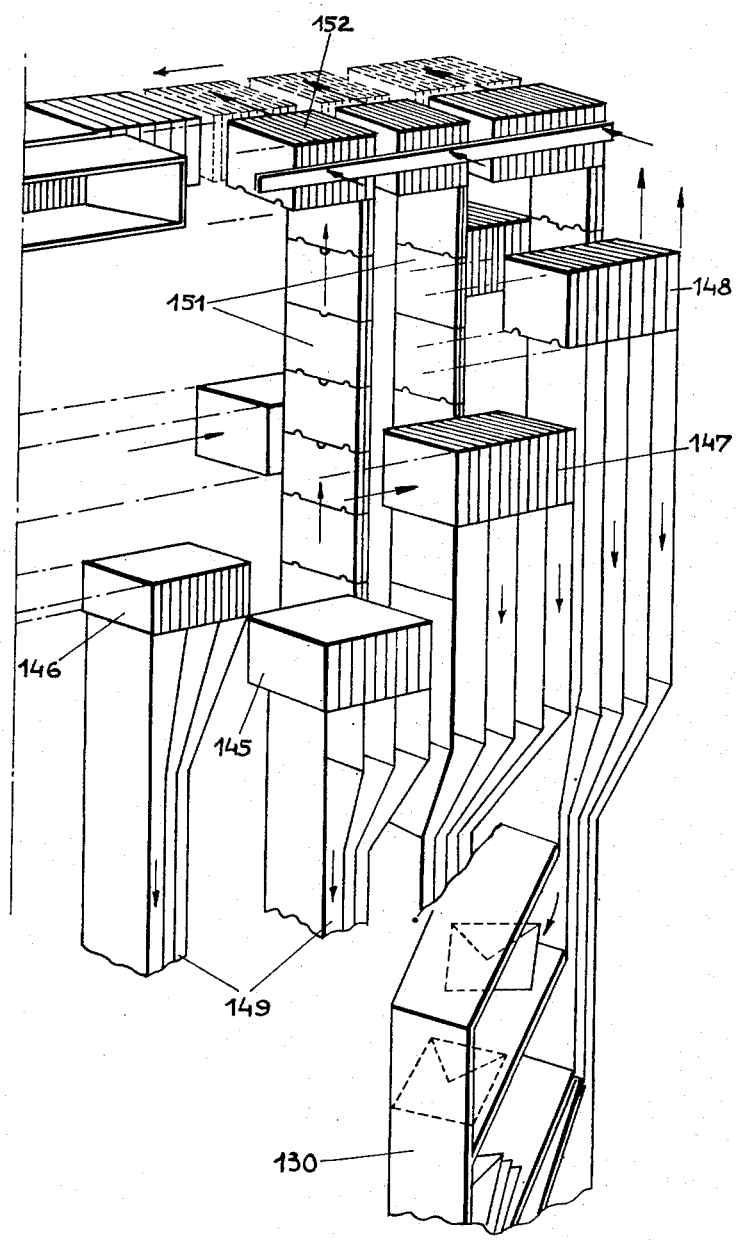

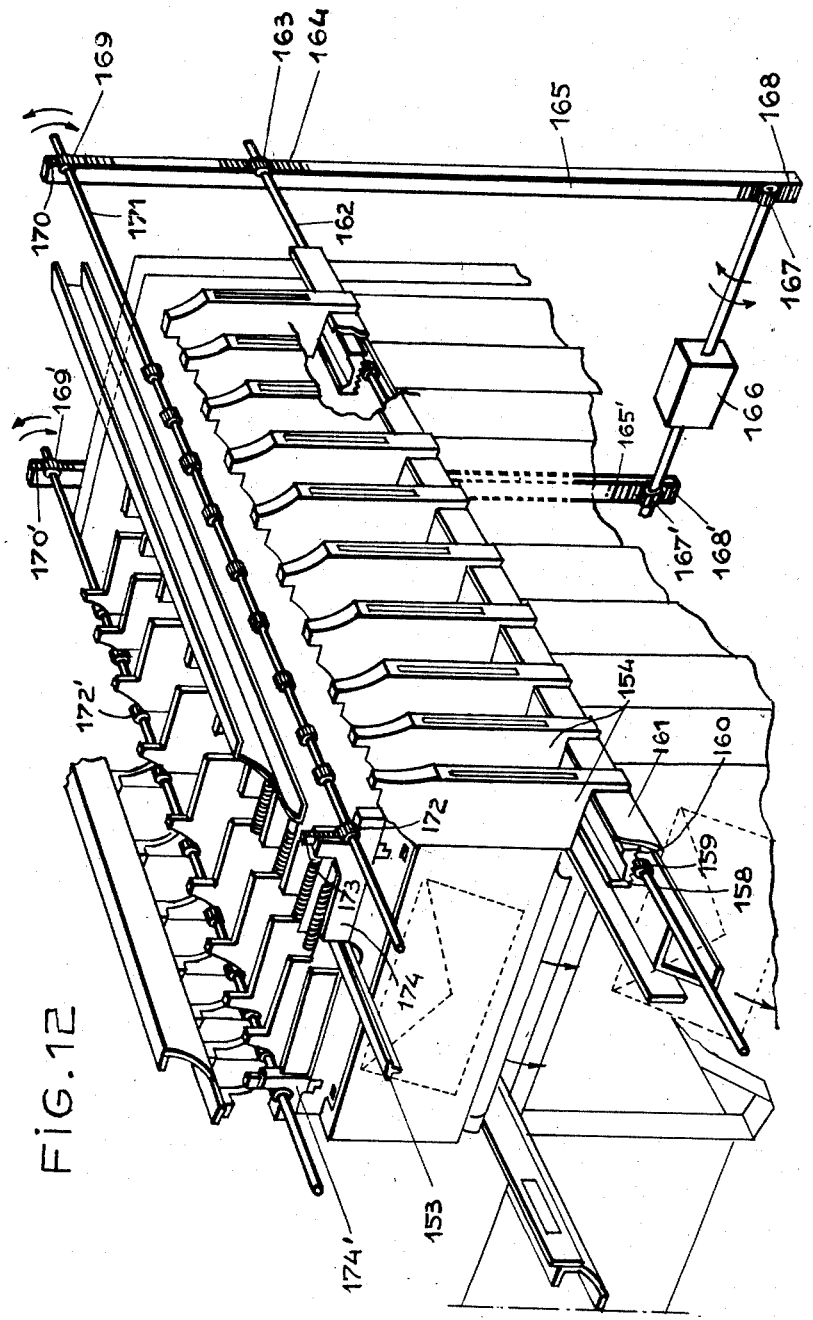

Feb. 16, 1954 R. GOURDON 2,669,365
APPARATUS FOR SORTING ARTICLES SUCH AS MAIL
Filed Aug. 4, 1947 12 Sheets-Sheet 11

INVENTOR
Robert Gourdon
by George H. Cooley
HIS ATTORNEY

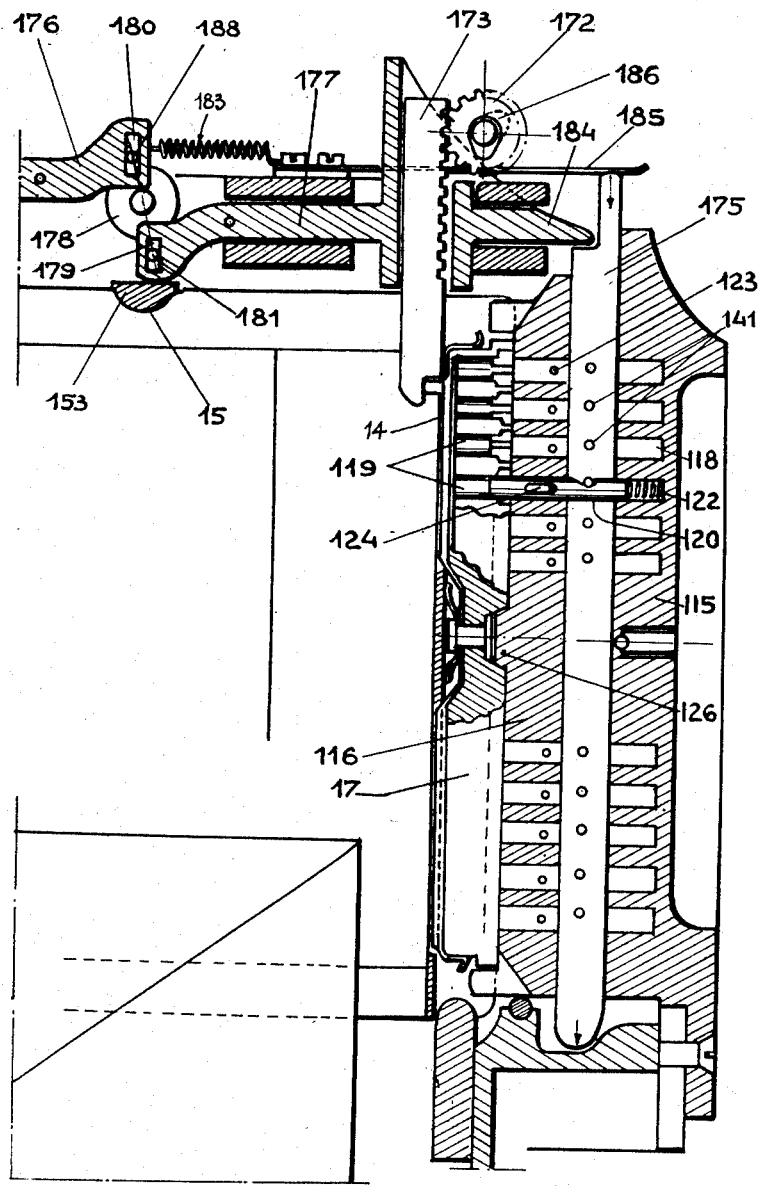

Patented Feb. 16, 1954

2,669,365

UNITED STATES PATENT OFFICE 2,669,365

APPARATUS FOR SORTING ARTICLES
SUCH AS MAIL

Robert Gourdon, Paris, France, assignor to Centre d'Etudes M. B. A. (Mecanique Balistique et Armement), Paris, France Application August 4, 1947, Serial No. 765,946

Claims priority, application France August 3, 1946

9 Claims. (Cl. 214—11)

(Granted under the provisions of sec. 14, act of
March 2, 1927; 357 O. G. 5)

The present invention relates to apparatus for the sorting and classifying of mail and other articles of similar sheet-like shape.

It relates more particularly to apparatus of the type in which the articles to be sorted out and to be classified, are introduced, after identification, into receptacles provided with means for identification and these receptacles are thereafter loaded into blocks, the operations of sorting being subsequently carried out with these receptacles and blocks, and the classification being then performed by discharging the receptacles into particular emplacements.

Numerous machines for carrying out such a sorting process have been proposed, all of which use receptacles, coded or not, carried along in a continuous and rigid fashion through the handling apparatus, for example fixed on conveyer belts or to transfer cables. Whichever be the forms of mechanical embodiment of the machines provided to this effect, the handling of the articles and of their receptacles, has always been contemplated under the aspect of a sequence of working steps in which the successive operations were rigidly tied to each other following a compulsory and predetermined rhythm of operations, for the operators as well as for the mechanisms.

It is an object of the present invention to provide ways and means for sorting and classifying mail and similar articles, lending themselves particularly to an automatic performance, which assure the independence of the rhythms of work for the various operations (identification of the articles, loading of the coded receptacles, transfer of the receptacles to blocks, sorting and discharging), and offer a great flexibility of utilisation, adaptable to all conditions of supply of the articles to be sorted, and of a satisfactory speed of sorting.

It is another object of this invention to provide apparatus for sorting and classifying which involves in addition to the above-mentioned advantages, the further one of allowing relatively slow rhythms for each function (loading of receptacles, sorting and discharging) while still maintaining a satisfactory over-all speed under the conditions of rapidity required.

It has the further object of providing apparatus for sorting and classifying which offers the possibility of effecting, in the course of sorting operations, multiple simultaneous selections of the coded receptacles, as well as means for the putting into effect of the said processes.

It has, besides, the object to provide apparatus for sorting and classifying, which is smaller and more compact than the cumbrous apparatus required by the processes hitherto used.

The apparatus for sorting and classifying contemplated by the invention is characterized notably by the separation of the operations of charging, of sorting and of discharging the receptacles, and their being carried out by means of elements which are separate though combinable elements, due to the fact that they provide, on the one hand, the use of independent individually coded receptacles and, on the other hand, the grouping of these independent elements into handling blocks which are independent themselves.

From this fact it follows in the first place that the identification of the letters or other articles, their introduction into the individual receptacles and, eventually, the coding of these receptacles, are saving an operator by working individually in any general rhythm of the operations of sorting and classifying.

It follows also that the conveying of the receptacles can take place by any operations of grouping or of separating appropriate to the conditions to be fulfilled and, in particular, it becomes possible to distribute the blocks of receptacles, starting from a loading position, between any desired number of positions of sorting, in which the separation of the receptacles will take place in as many stages of selection as will be necessary, intermediate regrouping being then possible according to the selection cascades provided.

According to another characteristic feature of the invention the regrouping of the separate receptacles into independent blocks takes place in the very position of identification of the letters or other articles, and of loading the receptacles, the latter in an automatic manner at the rhythm proper of the operator of the said position.

According to another characteristic feature of the invention the positions of identification of the documents or objects, and of loading the receptacles, are materially separated from the positions of sorting and of discharging, for example they may be performed in separate units (which, however, are so provided as to be capable of being combined), the independent blocks of receptacles issuing from a position of charging being thus capable of being directed to a position of sorting selected from several such positions. Conversely, several positions of loading may use but one position of sorting amongst many such positions.

According to another characteristic feature of the invention, the receptacles of each block are automatically locked as soon as the block is loaded, and automatically unlocked upon arrival of the block at a position of sorting where the said receptacles can be extracted from the block.

According to another characteristic feature of the invention, the passing of a block to a stage of selection provokes an automatic investigation of identity extending to all the receptacles of the block, which investigation takes place at the same time on all sides of the block; an automatic simultaneous extraction of the identified elements and the carrying along of the block to a subsequent stage of selection where its arrival gives rise, in the same manner, to similar operations, the receptacles extracted in each stage being regrouped either for a new selection or for their discharging to other positions which may, if desired, be materially distinct, or not, from the first position of sorting.

These characteristic features as well as additional other ones will be described in detail in the following specification of a particular example of embodiment applied to the case of sorting and of classifying of mail. The description is given with reference to the accompanying drawings, in which:

Figure 2 is a perspective view of a mail holder;

Figure 3 is a perspective view of a handling block of such mail holders;

Figure 3a is a detail of such a block on a larger scale;

Figure 7 is a perspective view of the lower portion of the mechanisms of said unit;

Figures 8A, 8B and 8C are views of one of the mechanisms of the selector unit in the positions of rest, active and passive operation;

Figure 11 is a perspective view of a classifying unit;

Figure 12 is a perspective view of the mechanisms for the discharging of the receptacles;

Figure 14 is a sectional side elevation of such a mechanism as mounted.

Figure 1 shows by way of example and in a purely diagrammatic manner a complete installation for the sorting and classifying of mail.

Figure 1:
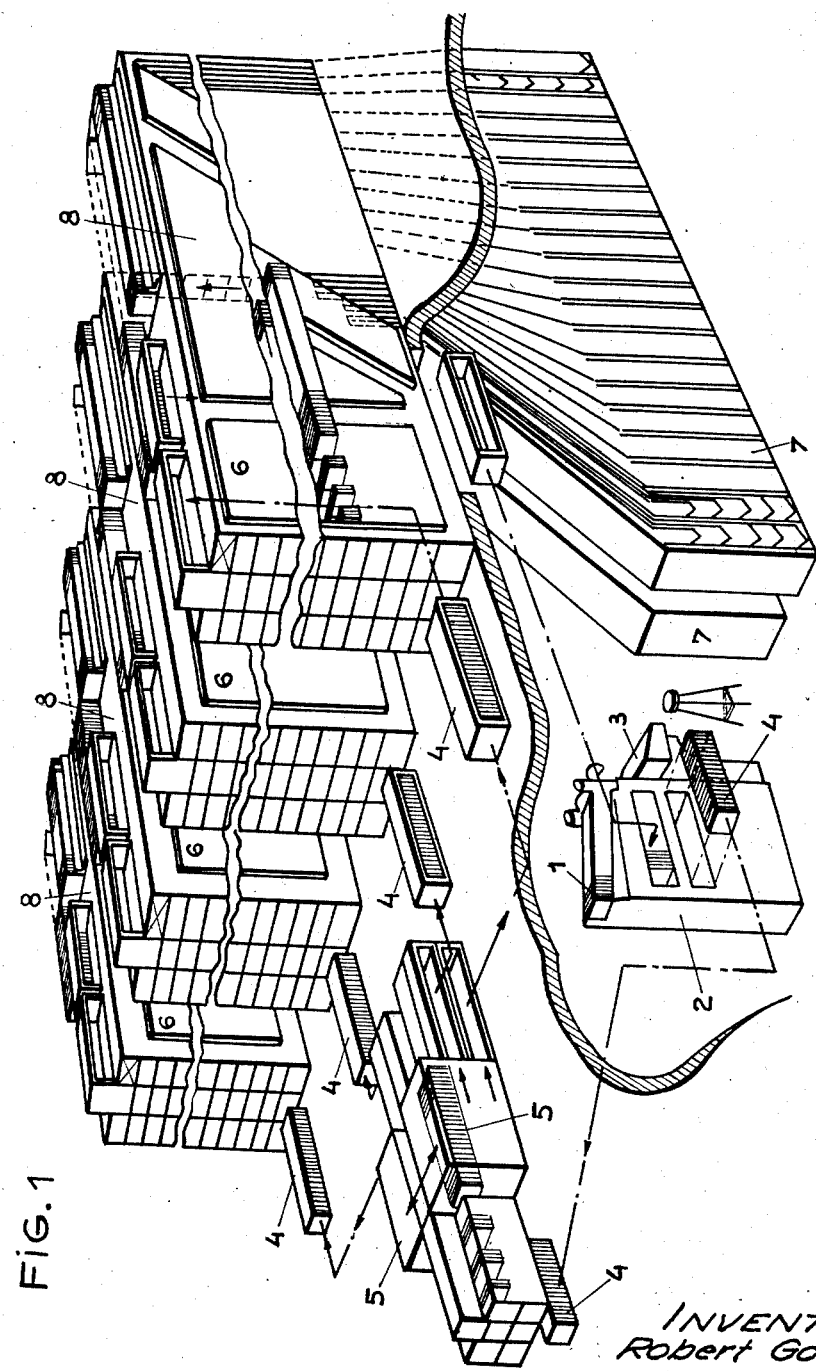
Fig. 1 illustrates somewhat diagrammatically in perspective a complete installation of sorting apparatus constructed in accordance with the present invention.

The sorting process carried through in this installation comprises a number of consecutive steps, beginning with the stacking of a long row of letters, standing on edge, on the top story of the "coding unit," while a row of open empty receptacles or mail holders is stacked in the story underneath. The operator, by means of appliances described hereinafter, causes the foremost letter of the row to be dropped into the foremost holder, after having defaced the stamps on the letter and having coded the holder in accordance with the address on the letter, before the letter enters the holder. The filled holders are then caused to descend, one after the other to a third story and are there collected in a long prismatic frame which, when filled, contains a row of letters coded for different directions. The filled frame or block is removed, in a horizontal movement, from the coding unit and transferred to one of a number of sorting units, each of which may house for instance ten such blocks superposed in ten compartments. Each block of holders in a sorting unit is now approached from either side by one of a pair of selectors and extractors, each of which is set for one of two regions or states or places or town sections or post offices. The extractor, when contacting one side of a box of filled and coded holders, will, by means of its selecting grippers, grip and extract only those holders whose coding elements are set for the same region, town or post office. The extracted holders are dropped into and collected in another box which contains only letters destined for the same region, town or post office, and the extracting and collecting procedure is repeated until the last sets of frames only contain letters addressed to the same post office. Hundreds of frames may be filled for different regions of a country, thousands for different districts or post offices, and the entire sorting installation may cover an area of a million square feet and may have a hourly performance of say 150,000 or more letters collected in thousands of letter boxes.

The letters or missives are piled up at 1 on the upper stage of an identification and indexing unit 2 in which they are introduced into the individual receptacles or pockets, under the control of an indexing desk 3. This control may either: apply to each receptacle an effaceable code sign which is characteristic for the destination of the letter inserted into it, or select as a receptacle for a letter one of those receptacles the predetermined code sign of which corresponds to the said destination. The independent pockets thus charged descend in the unit gradually as their loading progresses and are finally assembled in handling blocks, such as 4, at their exit from the unit.

The blocks 4 are then directed towards the sorting or selector units, i. e. either to such as indicated at 5 for a first stage for being sorted into a limited number of directions (four in the type of unit represented), or to such as indicated at 6 for a detailed sorting process followed by an immediate distribution into postal boxes 7 which takes place in the portion 8 of these units. In the case where one uses intermediate sorting units 5, the receptacles are regrouped into blocks which are subsequently directed to the units 6 which are respectively subjected to subsequent sorting steps in these principal directions.

In such a system, only the operations carried out in the units 5 and 6 are automatic and are performed at predetermined rhythms. The operations carried out in the unit 2 depend on the rhythm of work of the operator, and consequently the said rhythm may vary within wide limits without affecting the over all speed of sorting in the system.

In fact, one may use all appropriate combinations of indexing units 2, preselector units 5 and selector units 6, according to the hourly charge, variable in the course of the day, or according to the mean charge of the post office considered. For example, if the rhythm of automatic sorting in the units 5 and 6 is stepped up, one may use several identification and indexing units 2 for each unit 5 and 6. Or, alternatively, the units 5 may be dispensed with, or reduced to one or two units for a greater number of selection units 6 if the center concerned is of little importance.

It appears preferable, in order to simplify the putting into practice of the process, to provide, according to a secondary characteristic feature of the invention, that the receptacles used should have an effaceable code on their sides. The lateral disposition of the code marks on the receptacle allows, the receptacles to be piled into the blocks 4 in the direction of their thickness from which results a reduction of space requirement of the blocks or, from another point of view, a possibility of handling a greater number of receptacles per block. On the other hand, since the selection is carried out laterally, it is not necessary to provide at each position of sorting any auxiliary displacement of the receptacles in the block such as rocking or tilting which would have been necessary in order to make their code marks visible if the latter were carried by the front and/or rear faces of the said receptacles. Finally, this disposition facilitates the carrying out of the process of multiple extraction of the receptacles provided in another part of the device as one will see in what follows.

A preferred type of receptacle for the carrying out of the invention is represented in Figure 2. One sees that it consists of a pocket 10 open at its upper portion, the face or front wall 11 being shorter than the rear wall 12, and a bottom wall 13 capable of being opened, for example under the pressure of control bars 14 lodged in the pocket. The edges of the wall 12 are recessed at 15 in the center of the upper edge and at 16 near the ends of the lower edge, as shown, in order to facilitate the guidance and maintenance of the pockets in the blocks and paths of handling. Their lateral walls 17 are thickened and are provided with recesses 18 for receiving settable code index elements 119. Each index element has a generally cylindrical body, with a flat central projection 125 at its outer end. The inner end of each index element terminates in a conical surface which engages an aperture in a leaf spring 17a which biases the index element outwardly. The projection 125 cooperates with a series of peripherally spaced notches 18a located at the outer end of the recess 18. The sides of the notches engage the projection 125 and prevent the index element from rotating. Also, the projection 125 is longer at its outer end than the diametrical distance between the bottoms of the opposite notches, so that the index element is prevented from moving out of the recess 18. By pressing the index element 119 inwardly against spring 17a, it may be moved to a position where it can rotate free of the notches 18a. At that longitudinal position the index element 119 may be rotated to bring its projection 125 into alignment with a different pair of notches 18a. In this manner, the various index elements on a receptacle may be set in predetermined angular positions which serve as a code to indicate the proper classification of the article carried by the receptacle. For example, the index elements may be set to indicate the destination of a piece of mail which is inserted in the receptacle. At 19 a cavity is indicated that serves for guiding the coding and identification devices as will be described later. On the upper and lower faces of the thick walls 17 hooks, such as 20, are fixed, offering to the extractors used in the operations of selection a catch for the lateral withdrawal of an identified pocket from a handling block.

An example of a handling block is given in Figs. 3 and 3A. It consists of a frame 21 open at its lateral faces having flanges 22 for the guidance of the blocks in the course of their being handled. The inner, upper and lower faces of the blocks are provided with transverse grooves spaced by a distance corresponding at least to the thickness of one pocket, or alternatively, as indicated at 23, with transverse corrugations of an elementary width at least equal to the thickness of one pocket.

The loaded and indexed receptacles in the unit 2 present themselves at the bottom of the unit in a pile of a size equal to that of a block 4, and said pile is introduced by pushing (by means of any appropriate mechanism not shown in the drawing) into the empty block that is waiting it. The walls 12 of the receptacles assure their guidance in the grooves or corrugations 23 as will be seen from Figure 3, in which the block has been shown, for this purpose, incompletely loaded.

At the moment of loading, a longitudinal locking bar 24 is maintained raised by an appropriate component schematically indicated at 25, cooperating with a lateral projection 26 of the bar 24 and forming part of the structure of the unit 2. As soon as the block 4 is withdrawn from the unit, the member 25 disengages itself from the projection 26, and the bar 24 falls back into the slot 27 and penetrates thus into all the notches 15 of the pockets, which assures their being locked in position. The displacements of the bar 24 are guided by the fittings 28 on each end face of the block into which fittings the bar 24 is bent back. One sees that with such a structure of the block, the access to the lateral walls of the pockets is freed for any selection operation. These lateral walls carry an identification code which is adjustable as stated hereabove. The operations of coding and loading of the pockets are effected at the same time, according to a particular feature of the invention, the mail being moreover defaced in the indexing unit 2 by an operation carried out in the course of loading, according to another feature of the invention.

In order to simplify said description, at least in those parts that do not concern directly the present invention but have to be indicated for a purely illustrative purpose in order to facilitate the understanding of one of its possible manners of operation, the device of lateral coding will not here be described in detail. It may be one of the types described in my prior application for patent in the United States, Serial No. 722,198, filed January 15, 1947, now abandoned but continued-in-part by Serial No. 252,383, filed October 20, 1951. Likewise, the details of the indexing desk 3 and of the coding combination apparatus can be found in my prior patent applications filed on January 15, 1947, namely Serial No. 722,196, now Patent No. 2,469,035 dated May 3, 1949, and Serial No. 722,197, now abandoned but continued-in-part by Serial No. 300,160, filed July 22, 1952, and Serial No. 722,198, previously mentioned.

The blocks of pockets 4, Figure 1, are charged and coded and then passed individually to the sorting units such as the units 5 (preliminary sorting) or 6 (direct or final sorting). In each of these units, the sorting is effected according to a process of simultaneous multiple selection, also a characteristic feature of the invention, which will now be described with reference to the schematical drawings at Figures 4 and 5, and the example of an embodiment shown in the Figures 6 to 10.

When, in the units 5 or 6, a block of pockets arrives at a stage of selection, two assemblies of identifying and extracting elements 70 and 71 come into contact with the lateral walls that carry the code signs of the pockets in the example chosen. These elements are of the same number as are the pockets in one block, and are of the same width as one pocket.

Figure 4:
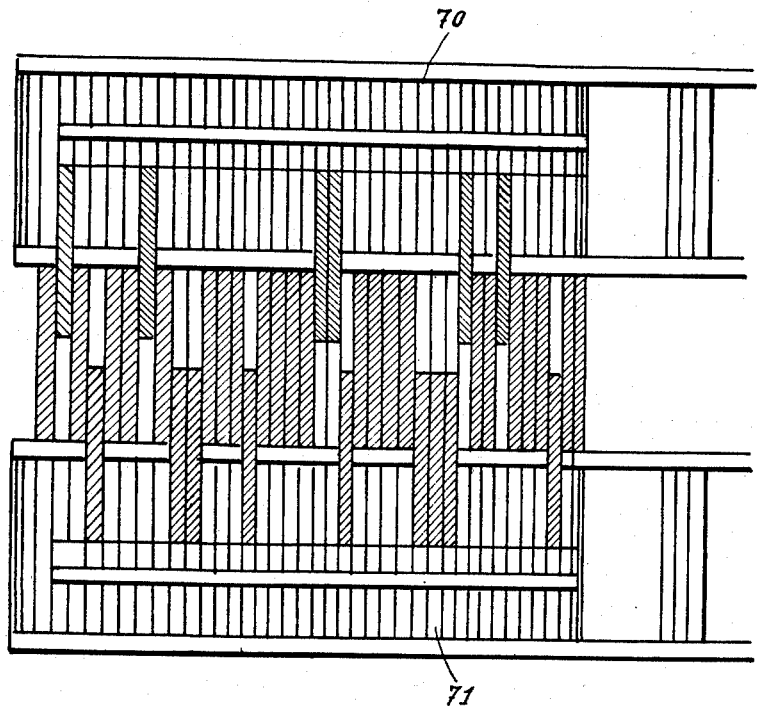
Figure 4 is a horizontal section at half height of a selection stage.

The characteristics of the identification devices which are incorporated into them have been predetermined in order to obtain the desired selection, and these devices control the gripping means for the extraction from the block, in a single operation, of the pockets identified at the time of the course of retraction of the assemblies 70 and 71. The Figure 4 shows such a process of extraction in the course of being performed.

Figure 5:
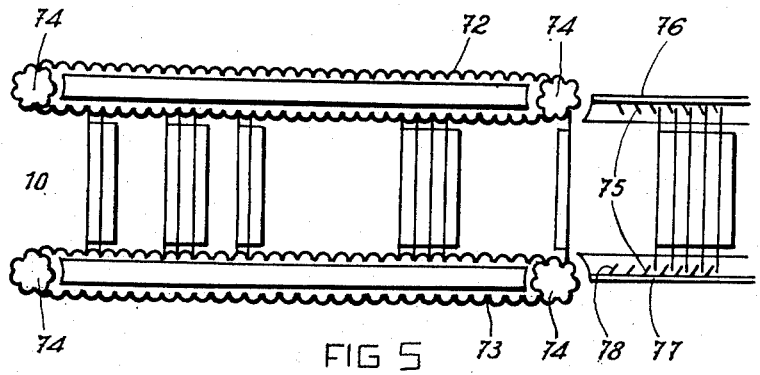
Figure 5 is a lateral view of this stage with the extractors omitted.

The extracted pockets are carried away by the extracting and identifying means from between the conveyer belts such as 72, and 73, Figure 5, the surface of which is undulated in order to assure their being maintained in a vertical position, where after these belts are carried along by rollers such as 74 in order to introduce the pockets in the regrouping passage ways 75. In these intermediate selection units, such as 5, Figure 1, the advancing of the pockets in these passage ways can be effected only by the successive introduction of pockets in the manner as they present themselves under the general shape of a pile capable of being introduced again into a handling block. However, in the selection and discharge units such as 6, Figure 1, the upper wall 76 and the lower wall 77 of these passage ways, which may be endless belts moving their planes equipped with undulation notches 78, can carry with them the pockets directly towards the discharging positions, a certain regrouping being assured by the difference in the linear speeds of displacement of the belts 72, 73 and of the walls 76—77. The walls may, alternatively be fixed and the conveyer belts may slide over them, assuring at the same time the maintenance of the pockets in a vertical position.

The operations described hereabove can obviously be carried out by numerous means of performing of which the Figures 10 to 14 represent a coherent example of embodiment.

Figure 6:
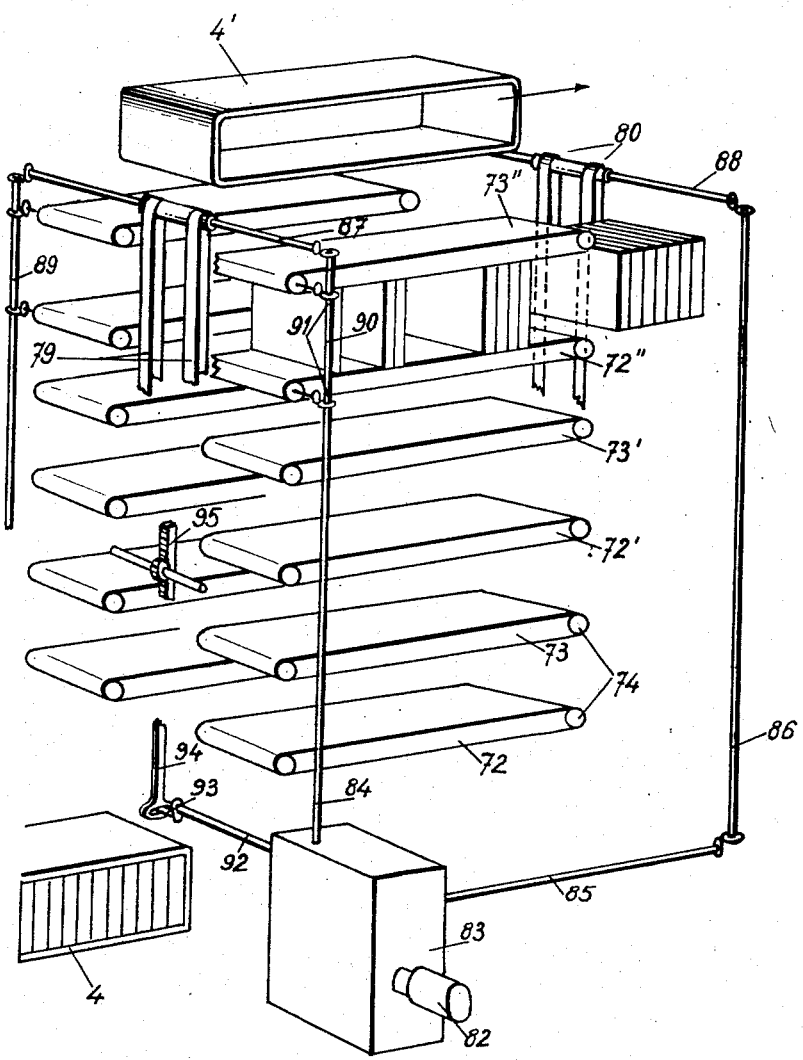
Figure 6 is a part perspective view of the mechanisms of a selector unit.

The general disposition of the mechanisms is illustrated on the Figure 6, the block 4 having to be carried successively to the three positions of selection defined by the pairs of conveyer belts 72—73, 72'—73' and 72"—73" and by the pairs symmetrically arranged; the path of displacement of the block 4 passes between these pairs of conveyer belts, the block being supported on the two pairs of conveyer belts 79 (front) and 80 (rear) by brackets such as 81, Figure 7, attached to the belts, to finish at the position 4' of the block where it is emptied of its pockets. The assemblies of identifying and extracting means 70 and 71 are not shown in Figure 6 in order to simplify the representation.

A motor 82 is in permanent mesh with a gear box 83 from where the kinematic scheme of transmission is as follows: a vertical front shaft 84 and a horizontal shaft 85 transmitting back to the rear vertical shaft 86; the two vertical shafts transmitting to the upper horizontal shafts 87 and 88 for driving the elevator bands 79 and 80. The shafts 87 and 88, in turn, transmit to lateral shafts of which one only is indicated at 89 in the front of the figure. On these vertical shafts 84 and 89 there are sleeves arranged such as 90 carrying gears 91 for the driving of the conveyer belts 72—73 etc. A transverse horizontal shaft 92 engages by means of a crank 93 an oscillatory vertical bar 94 disposed at the front of the unit between the elevator belts 79. This oscillatory bar 94 carries at each selection stage a toothed rack device, schematically indicated at 95 in the Figures 6 and 7, and represented in side elevation more in detail in the Figures 8A, 8B and 8C. This toothed rack device comes at times into engagement with a pinion 96 fixed on the threaded spindle 97 having two parts of opposite pitch by which the support 98 and 99 for the control of the pairs of assemblies of identifying and extracting means 70—71 (one pair per selection stage) are moved.

This drive is effected as follows: when the oscillatory bar 94 is in a low position, the toothed racks 95 carried by it by means of the articulation 100; are in the position with respect to the corresponding pinions 96 represented in the Figure 8A. At this moment the blocks 4 find themselves on the conveyer belts 79 in intermediate positions between the stages of selection. The gears 101 (output from the gear box), 102 (drive of the oscillatory bar 94) and 103 (drive of the shaft 104 of the conveyer belts 79) are in mesh and turn in the senses indicated by the arrows.

When the projection 105 of the block 4 comes into contact with the cam 106 (Figure 8B of the toothed rack, it makes the latter rock about the articulation 100 in such a manner that the fixed pin 107 carried by the bar 94 comes to bear against the inner edge opposite to that against which it bears in a position of rest; the toothed rack meshes then with the pinion 96 which, by the rotation of the shaft 97, controls the simultaneous inward displacement of the two assemblies of identifying and extracting means 70 and 71. The displacement of the supports 98—99 of these assemblies Figure 7 allows pieces such as 109 to rock about axles such as 108 in the direction of the arrow, where from results the release of the clutches such as 110 and the stopping of the rollers or conveyer belts 72—73 which have been driven up to that moment by the shaft 84. The pin 107 slides in the groove 111 of the toothed rack until the projection 105 of the block to be discharged releases the cam 106 of the toothed rack, see Figure 8C.

At this moment the belts 79 and the bar 94 are immobilised during a period sufficient for the identification of the block, although the motor 82 and the axle 84 continue turning, due to the fact that the gears 102 and 103 comprise smooth sectors 112 and 113, respectively, provided for that purpose as indicated in Figure 7. Anyway, the sector 112 is of a shorter length than the sector 113 so that the bar 94 and consequently the toothed rack 95 descend again while the block 4 is still stationary which has the result of operating the withdrawal of the identifying and extracting means (with the identified pockets). The pin 107 disengages itself from the groove 111, and the toothed rack disengages the pinion 96 due to its articulation 100. At the same time the supports 98 make the pieces 109 rock in the reverse sense which establishes engagement of the clutches 110 and actuates the rollers 72—73 for the removing of the pockets extracted as described with reference to the Figures 8 and 9. Thereafter the conveyer belts 79 are again driven, and the block 4 continues its course towards the higher stage.

According to the rhythm imparted on the device, it may be desirable to introduce the blocks 4 into the unit, for example only with an interval of two selection stages between the blocks. In the stages where there is no block being displaced, the toothed rack 95 does not enter into mesh with the corresponding pinion 96, and the nipple 107 displaces itself then in a second groove 104 of the toothed rack the guidance of which is thus assured in any case.

The assemblies of identifying and extracting means can be provided under many forms according to the modes of embodiments of the pockets and their codes, but, anyway, for the sake of the simplicity of their construction and control they will be preferably constituted of similar independent elements, assembled in a common mounting. In the case where the structure of the pocket is such as represented in the Figure 2, and where the coding is effected in the manner described with reference to the Figures 1 to 6 of the U. S. patent application Serial No. 722,198, now abandoned but continued-in-part by Serial No. 252,383, filed October 20, 1951, the abandoned case corresponding to the French patent application Ser. No. 508,757, filed by the applicant on January 16, 1946, under the title "Receptacles or Pockets with Adjustable Identification Codes, and Devices Relating Thereto," any identification and extracting means may be provided that has the particular characteristics which have been described with reference to the Figures 9 and 10.

Figure 10:
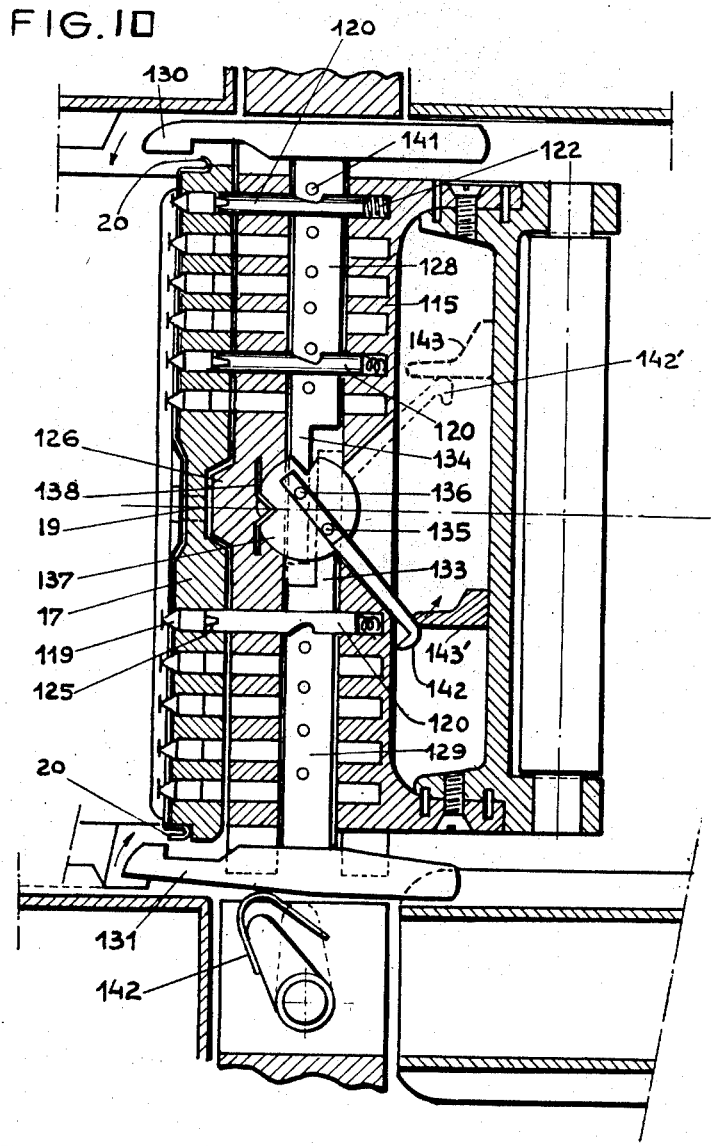
Figures 10 and 10A are views of sectional side elevation and cross section, respectively, of a mechanism for extraction as mounted.
Figure 10A:
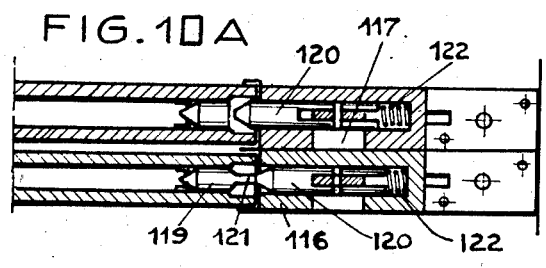
Figure 13A:
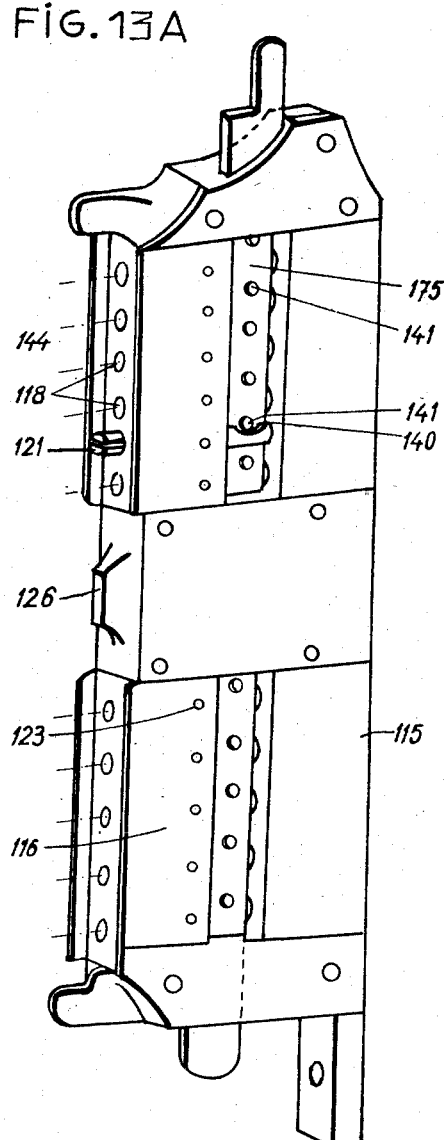
Figures 13A and 13B are a perspective and a front view, respectively, of an identifying and discharging mechanism as used in such classifying units.
Figure 13B:
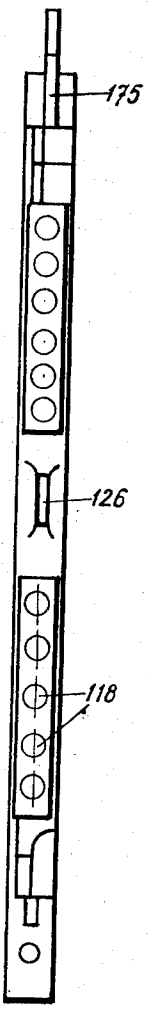
Figure 13C:
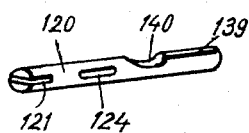
Figure 13C is a perspective view of an element of the said mechanism.

The body of the identifying and extracting means is constituted by an elongated piece of U-section, 115, 116, 117, as will be better visible on the Figure 10A. The flanges 115 and 116 are pierced by as many channels 118 as there can be code index elements 119 lodged in the wall 17 of the pockets, Fig. 10. The channels 118 traverse completely the wall 116, and end in blind holes in the wall 115. In certain of these channels there are lodged the identification elements 120, in accordance with the codes of the selection stage under consideration.

Figure 9A:
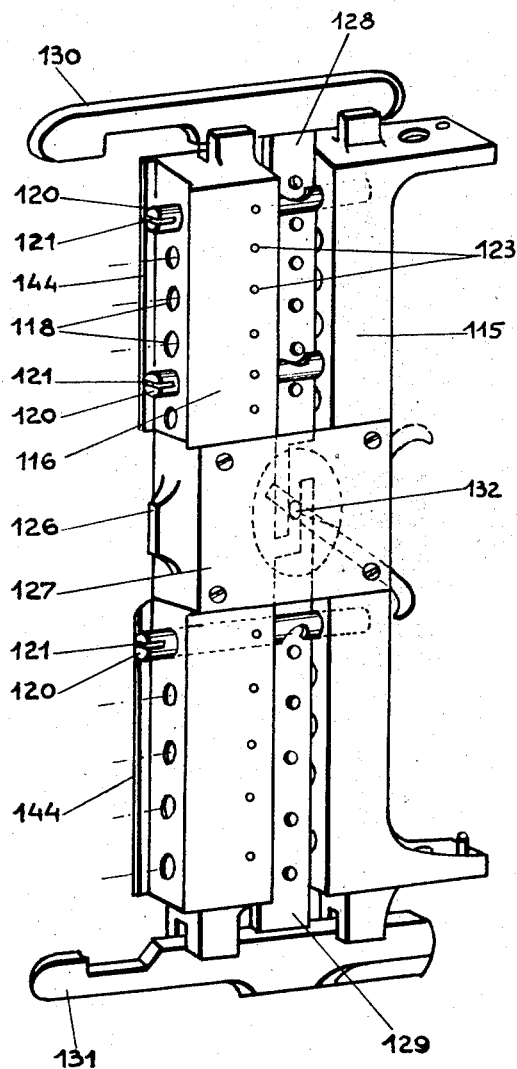
Figures 9A and 9B are a perspective and a front view, respectively, of a mechanism for the identification and extraction as used in such units.
Figure 9B:
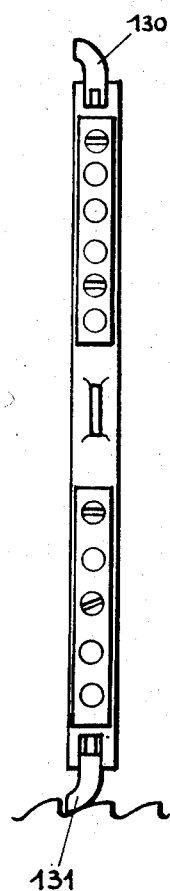
Figure 9C:
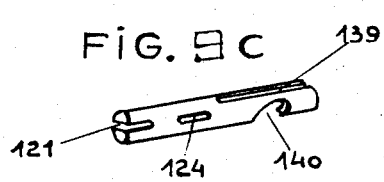
Figure 9C is a perspective view of an element of the said mechanism.

These elements 120, one of which is represented in perspective on the Figure 9C, have a cylindrical or prismatic body, the front end of which is transversely split at 121; they are pushed forward by springs 122 lodged in the blind channels of the wall 115, Figures 10 and 10A, their travel being limited by pegs 123, Figure 9A, passing across the wall 116 and through elongated holes 124 of their body, Figure 9C, in such a manner that they can undergo a certain shifting motion in their channels 118 against the action of the springs 122 without being able to perform a rotation.

Thus, when the identifying and extracting means are led against the lateral walls of the coded pockets, as indicated on the Figures 10 and 10A, the slots 121 engage themselves with the projections 125 of the code elements, and the identification elements remain in their projecting positions under the action of the springs 122, if there is congruity of code; on the contrary, if there is no congruity of code, see Figure 10A, lower portion, the front end of the element 120 abuts against the corresponding projection 125 of the code index, and consequently the element is repelled backwards against the action of the spring 122. Upon interruption of contact it will be automatically restored to a projecting position.

In this operation, the accuracy of guidance or relative centering between the wall 17 of the pocket and the identifying and extracting means is assured by the penetration of the lateral projection 126 of the center portion 127 of this component into the recess 18 of the wall, and a lateral guidance is provided thanks to plates such as 144 (Fig. 9A) which come to slide between two consecutive pockets.

The identification thus effected if positive brings about the automatic seizure of the pocket by the gripping mechanism serving for the extraction. This mechanism consists of two bars 128 and 129, each carrying at one end a gripping bar 130, 131 of a curved profile, such as represented on the Figure 9B, and cut off at their other end in the manner shown on the Figures 9A and 10, in such a way as to be capable of undergoing a relative shifting motion by gliding under friction on the axle 132 (Fig. 9A). This axle is carried by the wall 117, the said bars being lodged between the flanges 115 and 116 of the extractor body.

The inner, cut off, ends 133 and 134 of these bars carry pins 135 and 136 which slide in a groove in a cam 137 in such a manner as to assure the turning of the said cam when the bars displace themselves simultaneously, approaching or separating themselves with respect to one another, the said cam turning against the action of a spring 138, Figure 10, which assures for it two locked positions corresponding to the open and closed positions, respectively, of the extractor.

The identifying elements are slotted on the rear at 139, Figure 9C, in a manner to fork themselves over the bars 128 and 129, and moreover present notches 140 which, at rest, find themselves facing the abutments 141, carried by the said bars (there are as many abutments 141 as channels 118).

Therefore, if there is congruity of code, Figure 10, the bars 128 and 129 approach one another under the action of a spring 142 (Fig. 10) lodged in the structure of the unit (one spring per identifying and extracting position) due to the fact that their abutments 141 will penetrate into the corresponding notches 140 of the identifying elements in place. These springs 142 are mounted on a single control axle capable of turning about 90° if desired; the cam 137 will then turn and lock itself in the extraction position. The gripping bars 130 and 131 will then seize the identified pocket by the hooks 20 of said pocket and will carry it with consequently as soon as the assembly of the identifying and extracting means performs its return stroke as described hereabove.

If there is no congruity of code the abutments 141 will bear against the body of the identifying means, and the bars 128, 129 will not be able to approach one another, in spite of the bias of the spring 142 which will hide itself in its housing.

At the end of this return stroke the selected pockets are released from the assemblies of identifying and extracting means thanks to the following disposition:

Each cam 137 carries a lever 142' which, in a rest position, finds itself directed downwards and, in an active position, upwards (the position indicated in dotted lines at 142" on the Figure 10), this lever displacing itself in a recess of the wall 115 made for this purpose.

A bar 143, common to all the identifying and extracting means of one block, is then lowered until it reaches the position indicated at 143", thus causing the lowering of the levers 142' which had been operated in consequence of the turning of the corresponding cams 137; hence the separation of the bars 128 and 129 from one another which releases the extracted pockets. For the sake of simplicity of the drawings, the control mechanism of said bar 143 has not been shown anywhere being simple to conceive in itself, starting from the gears shown on the Figures 6 and 7.

The fixation of the identifying and extracting means in their support can be such as illustrated; it will not be described in detail, neither will certain forms of the body of these elements, being capable of numerous variations of embodiments which do not specifically form part of the invention proper.

One has, besides, to remember that the embodiment as described hereabove can be altered in its details or in accordance with the code, without leaving thereby the general ambit of the invention, although it offers interesting characteristics in the case of the coding device contemplated.

The pockets thus extracted at each stage of selection are then regrouped as described with reference to the Figures 4 and 5, in view of their being discharged into the corresponding set of postal pigeon holes. The Figure 11 shows different assemblies of regrouped pockets such as 145, 146, 147, 148 passing over the discharge chutes such as 149 which lead the letters released from the pockets to the postal boxes such as 150. Thereafter, the empty pockets are removed by being carried to the center, and lifted again, such as indicated at 151, to a position of removal 152. The handling means are not indicated in this case, since they may consist of conveyer belts well known in themselves in the art.

The discharging of the pockets requires a new automatic identification and, according to certain characteristics of the invention, this latter identification takes place with an assembly of regrouped pockets, and controls automatically the discharge if the identification is positive, when passing the corresponding position, the advance taking place step by step in the intervals of identification (said step being capable of being a multiple one according to requirements and controls). An example of embodiments of the mechanisms which come into play in these operations, which is particularly interesting, will be described with reference to the Figures 12 to 14.

The Figure 12 shows schematically a point of identification and of discharge having ten positions, corresponding for example to the assembly of regrouped pockets 145 of the Figure 11. When the pockets arrive at the point under consideration, they are accepted only at the rhythm determined by the settings (here ten by ten) due to the fact that a locking bar 153 is applied to the upper recess 11 of their rear wall and is periodically unlocked for the advancing (by transport means not shown) in synchronism with the operations of identification and discharge in such a manner that these operations take place during the state of rest of the pockets. One will note that the speed of this advance does not depend on the number of pockets discharged in parallel.

In order to do this, a row of identifying means 154 is fixed to a bar 158 which can undergo a transverse displacement of a small amplitude by the meshing of a pinion 159 with a toothed rack 160 (the latter being provided under the bar 158) in a guide angle 161. The pinions 159 are mounted on an axle 162 the end of which carries a pinion 163 in mesh with the toothed rack 164 of a vertical bar 165. This bar is animated by a reciprocating movement derived from a gear box 166, for example by means of the mechanism comprising a pinion 167 and a toothed rack 168; the box 166 may comprise a motor or may better be driven by transmission from a common motor associated with all of the discharge controls.

At the upper end of the bar 165 there is disposed a transmission consisting of a pinion 169 and a toothed rack 170 for the synchronous alternative drive of an axle 171 which, by means of the pinions 172 carried by it, serves to operate the toothed racks 173 of the devices for opening the pockets in case of congruity of code. In fact, as one sees from the Figure 14, the opening of the pocket is effected by the lowering of the toothed rack 173 which pushes back the inner opening bars 14 of the pocket. It is, moreover, clear that the same operation is simultaneously effected at the other end of the pocket by corresponding elements as indicated on the Figure 12 which shows this duplication, the corresponding elements being denoted by a prime ('). Anyway, the identifying means are used only on one side. The possibility of descent of the toothed rack is conditioned by the driving in of the bar 175 of the identifying means. This means is of a design similar to that of the identifying and extracting means of the Figures 9 and 10; the corresponding elements, too, are denoted by the same designations in the Figs. 13A to 13C and 14; the locking of the pockets by the bar 153 takes place under the control of the identification means by the mechanism indicated in the Figures 12 to 14. This mechanism is constituted by two bars 176 and 177 capable of sliding laterally in the structure of the unit, and in engagement with a cam 178 by their slots 179 and 180 into which penetrate the pins 181 and 182, carried by said cam. The bar 176 is constantly redrawn by the spring 183 attached to the structure of the unit in such a manner that the end of the bar 177 bears on the locking bar 153 of the pockets. The bar 177 is continued at 184 beyond the toothed rack 173.

When the identifying means 154 are spaced apart in order to allow the pockets to advance, the spring 183 acts so as to rock the cam, and, consequently, to disengage the locking bar 153. This movement is made possible by the fact that the end 184 of the bar 177 can be displaced laterally.

When the identifying means return towards the pockets, the bar 175 bears against the extension 184 of the bar 177 and pushes that bar back, causing the inverse rocking of the cam against the bias of the spring 183, hence pressure of the bar 177 against the locking bar 153 and maintenance of the pocket.

If the identification is negative, the bar 175 can not be lowered, because of an abutment 141 bearing against the body of the corresponding identifying element, and the upturned flat spring 185 assures the disengagement of the pinion 172 as indicated in dotted lines at 186. If the identification is positive the bar 175 descends, the spring 185 is not raised, and the pinion 172 meshes with the toothed rack 175 in order to cause its being lower; hence the penetration of the bars for the opening of the pocket. It is clear that at the same time the extension (not shown) of the rod 176 assures the same operation of the toothed rack at the other side of the pocket. The letter thus released falls into a chute that conducts it to the corresponding postal box.

Although the invention has been described with reference to particular examples of elements and members for its performance, one should note that it is by no means limited thereto, but, on the contrary, that numerous alternatives of embodiment can be contemplated without departing from its ambit.

One should also note that it is capable as a whole or in part of numerous applications to other fields than that of sorting mail.

What I claim is:

1. Apparatus for carrying a plurality of articles to be stored, comprising receptacles for said articles having upper and lower vertical flanges, a box-like frame open at the sides for insertion and removal of receptacles therefrom, said frame having its upper and lower surfaces grooved to receive said receptacle flanges so that each receptacle inserted in the frame is maintained in a position fixed with respect to the frame, code index elements in those exterior walls of said receptacles which are accessible through said open side when the receptacles are inserted in said frame, said elements being settable to indicate the classifications of the articles contained in said receptacles, a locking member mounted on the outside of said frame and extending longitudinally thereof for movement through an aperture in a longitudinal wall of said frame, said receptacles having locking notches in one of their flanges for receiving said locking member, said receptacles being locked in said frame when said member engages said notches, and means for operating said locking member inwardly through said aperture to lock said receptacles and outwardly therethrough to unlock said receptacles.

2. Apparatus for sorting articles, comprising receptacles for said articles, a block for carrying a plurality of receptacles including a box-like frame open at the sides for insertion and removal of receptacles therefrom, cooperating guiding surfaces on the frame and the receptacles for maintaining each receptacle inserted in the frame in a position fixed with respect to the frame, code index elements in the exterior walls of said receptables which are accessible through said open side when the receptacles are inserted in said frame, said elements being settable to indicate the classifications of the articles contained in said receptacles, means for locking said receptacles in said block, means for releasing said locking means including a member projecting from said block, means for moving said block to a block unloading station, an abutment positioned adjacent said unloading station for engaging said member as said block approaches said station, said member being effective when engaged by said abutment to operate said lock releasing means to release said receptacles, and means at said block unloading station for removing the classified receptacles from the block.

3. Apparatus for sorting articles, comprising receptacles for said articles, a block for carrying a plurality of receptacles including a box-like frame open at the sides for insertion and removal of receptacles therefrom, cooperating guiding surfaces on the frame and the receptacles for maintaining each receptacle inserted in the frame in a position fixed with respect to the frame, code index elements in those exterior walls of said receptacles which are accessible through said open side when the receptacles are inserted in said frame, said elements being settable to indicate the classifications of the articles contained in said receptacles, means for moving said block to a block unloading station, means at said block unloading station for removing the classified receptacles from the block, means for transferring the receptacles from the block unloading station to a working station, and means at said working station for performing a sorting operation on said receptacles.

4. Apparatus for sorting articles, comprising receptacles for said articles, a block for carrying a plurality of receptacles including a box-like frame open at the sides for insertion and removal of receptacles therefrom, cooperating guiding surfaces on the frame and the receptacles for maintaining each receptacle inserted in the frame in a position fixed with respect to the frame, code index elements in those exterior walls of said receptacles which are accessible through said open side when the receptacles are inserted in said frame, said elements being settable to indicate the classifications of the articles contained in said receptacles, means for moving said block to a block unloading station, and selecting means at said block unloading station for identifying and removing from the block only those receptacles whose code index elements are set in a predetermined code.

5. Apparatus for sorting articles as defined in claim 4, including means for assembling the receptacles removed at the block unloading station in a compact group.

6. Apparatus for sorting articles, comprising receptacles for said articles, a block for carrying a plurality of receptacles including a box-like frame open at the sides for insertion and removal of receptacles therefrom, cooperating guiding surfaces on the frame and the receptacles for maintaining each receptacle inserted in the frame in a position fixed with respect to the frame, code index elements in those exterior walls of said receptacles which are accessible through said open side when the receptacles are inserted in said frame, said elements being settable to indicate the classifications of the articles contained in said receptacles, means for moving said block sequentially past a series of block unloading stations including means for stopping the block at each station, means at each unloading station operative while the block is stopped to remove those receptacles whose code index elements are set in predetermined code classifications, so that the block is empty when it leaves the last of the series of stations.

7. Apparatus for sorting articles, comprising receptacles for said articles having upper and lower vertical flanges, a block for carrying a plurality of receptacles including a box-like frame open at the sides for insertion and removal of receptacles therefrom, said frame having its upper and lower internal surfaces grooved to receive said flanges so that each receptacle inserted in the frame is maintained in a position fixed with respect to the frame, code index elements in those exterior walls of said receptacles which are accessible through said open side when the receptacles are inserted in said frame, said elements being settable to indicate the classifications of the articles contained in said receptacles, means for moving said block to a block unloading station, means at said block unloading station movable into engagement with said accessible exterior walls of said receptacles for removing the receptacles from the block, said receptacle removing means comprising means for sliding the receptacles endwise in said grooves, and grooved upper and lower endless belts extending parallel to the block at said block unloading station for receiving in their grooves receptacles removed from said block.

8. Apparatus for sorting articles as defined in claim 4, in which said receptacles carry code index elements at both sides thereof, and including at said block unloading station separate selecting means at opposite sides of the block for removing therefrom receptacles whose code index elements are set in different predetermined codes.

9. Apparatus for sorting articles as defined in claim 3, including means at said working station for holding said receptacles stationary, and means for emptying the stationary receptacles.

ROBERT GOURDON.

References Cited in the file of this patent

UNITED STATES PATENTS

| Number | Name | Date |
| --- | --- | --- |
| 919,810 | Barry | Apr. 27, 1909 |
| 1,170,091 | Molyneux | Feb. 1, 1916 |
| 1,237,747 | Cadden | Aug. 21, 1917 |
| 1,479,321 | Runsvold | Jan. 1, 1924 |
| 2,006,844 | Smith | July 2, 1935 |